US012662173B2

(12) United States Patent
Theis et al.

(10) Patent No.: US 12,662,173 B2
(45) Date of Patent: Jun. 23, 2026

(54) TREAD STEP SEAL ASSEMBLY FOR A TREAD SYSTEM OF A VEHICLE

(71) Applicant: Bode—Die Tür GmbH, Kassel (DE)

(72) Inventors: Christoph Theis, Bad Wildungen (DE); Marco Cimmino, Adelebsen (DE); Ulrich Arend, Dickershausen (DE)

(73) Assignee: BODE—DIE TÜR GMBH, Kassel (DE)

( * ) Notice: Subject to any disclaimer, the term of this patent is extended or adjusted under 35 U.S.C. 154(b) by 750 days.

(21) Appl. No.: 18/078,256

(22) Filed: Dec. 9, 2022

(65) Prior Publication Data

US 2023/0182786 A1      Jun. 15, 2023

(30) Foreign Application Priority Data

Dec. 10, 2021    (DE) ..................... 20 2021 106 746.2

(51) Int. Cl.
B61D 23/00        (2006.01)
B60R 3/02         (2006.01)
B61D 23/02        (2006.01)

(52) U.S. Cl.
CPC ................ B61D 23/00 (2013.01); B60R 3/02 (2013.01); B61D 23/025 (2013.01)

(58) Field of Classification Search
CPC ...... B61D 23/025; B61D 23/00; B61D 23/02; B61D 19/008; B60R 3/02
See application file for complete search history.

(56) References Cited

U.S. PATENT DOCUMENTS 2,951,454 A * 9/1960 Candlin, Jr. ........... B61D 23/02
                                                          280/166
2021/0331715 A1  10/2021 Theis et al.

FOREIGN PATENT DOCUMENTS

| CN | 202138388 U * | 2/2012 | |
| DE | 102008061852 A1 * | 6/2010 | .......... B61D 23/025 |
| DE | 102014208288 A1 | 11/2015 | |
| DE | 102017002018 A1 * | 9/2018 | .............. B60R 3/02 |
| EP | 2602167 A1 * | 6/2013 | .......... B61D 23/025 |
| EP | 3666619 A1 * | 6/2020 | .......... B61D 19/008 |
| WO | WO-2016083586 A1 * | 6/2016 | .......... B61D 23/025 |

* cited by examiner

*Primary Examiner* — Cheng Lin
(74) *Attorney, Agent, or Firm* — CANTOR COLBURN LLP

(57)        ABSTRACT

A modular tread step seal assembly includes a tread step module which, using a drive unit, is movable along a movement axis from a retracted position in the direction of an extended position and vice versa. The tread step module has a tread surface extending in a tread surface plane oriented parallel to the movement axis and a tread step module front edge at a front end directed towards the outside of the vehicle. The assembly includes a sealing strip attached to the tread step module front edge and extends along the same, substantially in a sealing strip plane. The sealing strip and tread step module define, perpendicularly to the movement axis, a vertical assembly height. The sealing strip and tread surface are disposed at an angle to each other. The wherein assembly height and the angle between the sealing strip and the tread surface are adjustable via a modular mechanism.

17 Claims, 2 Drawing Sheets

TREAD STEP SEAL ASSEMBLY FOR A TREAD SYSTEM OF A VEHICLE

CROSS-REFERENCE TO RELATED APPLICATIONS

This application is related to and claims the benefit of German Patent Application No. 20 2021 106 746.2, filed on Dec. 10, 2021, the contents of which are herein incorporated by reference in their entirety.

TECHNICAL FIELD

The present disclosure relates to a modular tread step seal assembly for a tread system implemented in a vehicle, in particular in a rail vehicle, comprising
- a tread step module, which, using a drive unit, can be moved along a movement axis from a retracted position in the direction of an extended position and vice versa, wherein the tread step module has a tread surface extending in a tread surface plane oriented parallel to the movement axis, and wherein the tread step module has a tread step module front edge at a front end directed towards the outside of the vehicle,
- a sealing strip, which is attached to the tread step module front edge and extends along the tread step module front edge substantially in a sealing strip plane, wherein the sealing strip and the tread step module define, perpendicularly to the movement axis, a vertical assembly height, and wherein the sealing strip and the tread surface are disposed at an angle to each other.

BACKGROUND

Tread systems with tread step modules (e.g. tread panels) that can be moved between a retracted position and an extended position are used, in particular, in passenger transport vehicles, e.g. in the area of public transport. One possibility is a use in, for example, road vehicles (e.g. buses) or rail vehicles (e.g. streetcars, subway cars, trams, commuter trains, long-distance trains, high-speed trains etc.). Tread systems are basically used for making boarding and exiting a vehicle easier; thus, they serve as an aid for entering and exiting. When a vehicle stops at a platform (for example), e.g. a train platform or bus platform, the vehicle is in a rest position, so that the passengers can enter the vehicle or leave the vehicle. In the process, it is almost inevitable that a gap between an outside of a vehicle and the platform needs to be bridged. Otherwise, a contact between the material of the outside of the vehicle and the platform would inevitably occur, which could result in the vehicle being damaged, e.g. in the form of damage to the body or paint.

If such a gap is too large, this may endanger or affect the passengers when entering the vehicle or exiting the vehicle. Accordingly, tread systems whose tread step module is extended or folded out in the direction of the platform when the vehicle is at rest constitute an option for reducing the size of the gap between the vehicle and the platform or train platform. Such a tread system may be configured, for example, in the form of a tread panel or tread step and, when passengers enter or exit, takes up the weight of the vehicle, i.e. is subjected to load by being stepped upon.

Within the context of the disclosure described herein, "extending" and "retracting" of the tread step module may be understood to mean a linear movement, a folding movement or a pivoting movement, or a combined linear and pivoting movement. Thus, a retracted position may well mean a folded-in or pivoted-in position of the tread step module.

Frequently, a gap and/or a difference in height must also be bridged in the case of the vehicle stopping at a location without a platform provided for the purpose (e.g. in the area of a sidewalk). Here, a tread system (including a movable tread step module) may make entering and exiting the vehicle easier. A tread system may serve at least for bridging a difference in height between the level ground and the floor of the passenger compartment even in the case of the vehicle stopping on level ground; this is all the more the case for physically handicapped passengers, e.g. wheelchair users. In this case, the tread step module may serve as a ramp.

In order to ensure a sufficiently safe footing for entering or exiting passengers and permit as long a life of the tread system in the case of permanent use, it is necessary for the tread system to have sufficient mechanical ruggedness. For this purpose, tread systems with tread panels or tread surfaces of metal are particularly suitable for this purpose. Moreover, the tread surface may be provided with patterns or mats having an anti-slip effect and reducing the danger of slipping for the passenger when entering and exiting.

Because of varying customer requests or structural conditions (e.g. available construction space), a customer-specific fabrication taking into account specific customer requirements is known from the prior art. Tread systems that can be adapted in a versatile manner with regard to selected system variables or system quantities (without having to be separately manufactured in a customer-specific manner) are not, or only to an insufficient extent, known from the prior art.

Generally, tread systems are sealed towards the outside of the vehicle with a sealing strip adjacent to the tread step module front edge. That prevents an unwanted entry of dirt and moisture into the mechanism and the electronics of the tread system. Together with the tread step module, the sealing strip defines the assembly height of the tread system. Depending on the structural conditions or customer requirements, however, it may be necessary to be able to adjust certain structural parameters, such as the assembly height of the tread system or an angle present between the sealing strip and the tread step module, or to adapt an already fabricated tread system to different customer requirements (like a modular building block set).

SUMMARY

Thus, the present disclosure is based on providing a tread step seal assembly that can be adapted in a flexible manner to different customer requirements.

A tread step seal assembly with the features of the independent claim is proposed in order to achieve these advantages.

It must be noted that the features cited individually in the claims can be combined with each other in any technologically meaningful manner and represent other embodiments of the disclosure. The description, in particular in connection with the figures, additionally characterizes and specifies the disclosure.

It may also be noted that a conjunction "and/or" used hereinafter, which is situated between two features and links them to each other, should always be interpreted such that, in a first embodiment of the subject matter according to the disclosure, only the first feature may be provided, in a second embodiment, only the second feature may be provided, and in a third embodiment, both the first and the second feature may be provided.

Accordingly, the disclosure relates to a modular tread step seal assembly for a tread system implemented in a vehicle, in particular in a rail vehicle, comprising a tread step module, which, using a drive unit, can be moved along a movement axis from a retracted position in the direction of an extended position and vice versa, wherein the tread step module has a tread surface extending in a tread surface plane oriented parallel to the movement axis, and wherein the tread step module has a tread step module front edge at a front end directed towards the outside of the vehicle, a sealing strip, which is attached to the tread step module front edge and extends along the tread step module front edge substantially in a sealing strip plane, wherein the sealing strip and the tread step module define, perpendicularly to the movement axis, a vertical assembly height, and wherein the sealing strip and the tread surface are disposed at an angle to each other.

The assembly is characterized in that the assembly height and the angle between the sealing strip and the tread surface can be adjusted via a modular mechanism. In this case, the adjustable assembly height is directly linked with the angle between the sealing strip and the tread surface. The modular mechanism may comprise several components that may each be adaptable with regard to their size (length, width) and be compatible with the tread step seal assembly (despite having a different size). Different assembly heights and/or angles between the sealing strip and the tread surface may also be provided by means of a variation in size of those components associated with the modular mechanism. The above-mentioned tread step module may be a tread panel or and assembly with a tread step (single tread step or double tread step).

The tread step module may be configured as a sliding step, folding step or ramp. The above-mentioned sealing strip may be made, wholly or in part, of metal, plastic or rubber. The sealing strip may also be made from a material composite of several of the above-mentioned materials. The tread step module may preferably made of metal, in particular in order to meet the required stability characteristics (i.e. capacity for bearing the load when stepped upon).

Further configurations of the assembly are described hereinafter. The following description includes those configuration features specified in the dependent claims but is not limited thereto.

According to a first configuration of an assembly proposed by the disclosure, it may be provided that the modular mechanism comprises a first adjustment member and a second adjustment member. In this case, the first adjustment member may be mechanically directly connected to the sealing strip, so that the position (angle) of the sealing strip corresponds directly with the position of the first adjustment member (particularly with regard to an angular position relative to the tread surface). The first adjustment member may (at least in some portions) rest flat against the sealing strip (a side of the sealing strip facing towards the inside of the vehicle). In one variant, the first adjustment member may furthermore directly provide or form the sealing strip. The first and second adjustment members provide module components that can be manufactured in various sizes (e.g. length or width) and combined with each other—as well as with the above-described assembly. For example, this permits a flexible adjustment of the assembly height and an angle present between the tread surface and the sealing strip. With such a modular system, an individual fabrication of certain components or of the entire tread system, which is necessary in the case of varying customer requirements, is avoided and permits the use of different module components that are compatible with one another. Such a modular building block system is more economical, reduces the production costs and decreases waiting times in manufacture.

According to another embodiment of an assembly proposed by the disclosure, it may be provided that the first adjustment member has at a first end a first cranked attaching bead and, at a second end opposite the first end, a receiving pocket, wherein a second cranked attaching bead is arranged between the first end and the second end. The above-mentioned first and second cranked attaching beads serve for connecting (attaching) the first adjustment element to the tread step module, which has receiving portions corresponding to the beads. The connection/attachment preferably takes place positively and non-positively, optionally with an interference fit (similar to a lock-and-key principle). The beads and/or the first adjustment element may be made from metal, plastic or rubber. The first adjustment element may a single-part or multiple-part component which may be made from one or several material(s). For example, the beads (or one of the beads) may be attached by vulcanization to the first adjustment member (or a basic body of the adjustment member of metal). The receiving pocket may serve for connecting the first adjustment element with the sealing strip, which may have an associated sealing strip bead. The sealing strip bead may be accommodated (e.g. with an interference fit) positively and non-positively in the receiving pocket. In particular, the sealing strip bead may be disposed on a lower (inner) end of the sealing strip, whereas the sealing strip can be fastened in another receiving portion (which may optionally be configured like a blind hole) with an attaching bead arranged at its upper (also inner) end. This may also take place with an interference fit. The upper attaching bead may also be made from rubber.

According to another embodiment proposed by the disclosure, it may be provided that the first and second cranked attaching beads protrude from a first side of the first adjustment member, that the receiving pocket also protrudes from the first side, and that the receiving pocket is at least partially open in the direction of a second side of the first adjustment member opposite the first side. Thus, the first and second cranked attaching beads are raised with respect to a surface associated with the first side (protrusion). The receiving pocket may have a U shape, C shape or circular shape in cross section. Depending on the type, the receiving pocket may have a blind-hole-like cross section.

According to another embodiment of an assembly according to the disclosure, it may be provided that a plurality of latching lugs, in particular two latching lugs, are formed on the first cranked attaching bead. The latching lugs may be made from the same material as the first cranked attaching bead. The latching lugs may also be made from a different material than the attaching bead. Like the second cranked attaching bead, the first cranked attaching bead may have an at least partially circular cross-sectional shape. The latching lugs extend radially outward from a surface of the first cranked attaching bead.

According to another embodiment of an assembly proposed by the disclosure, it may be provided that a first attaching bead receiving portion for receiving a first cranked attaching bead is formed on an underside of the tread step module facing away from the tread surface plane, wherein the receiving portion has a plurality of latching recesses, in particular three latching recesses, for receiving the plurality of latching lugs, in particular two latching lugs, so that the first adjustment member can adopt a plurality of angular positions, in particular two angular positions, relative to the first attaching bead receiving portion. In a special embodiment, three latching recesses may be provided in the first attaching bead receiving portion, whereas only two latching lugs are provided on the first cranked attaching bead. Therefore, the first cranked attaching bead can take up two positions in the attaching bead receiving portion. If the latching recesses situated side-by-side are labeled with the digits 1, 2 and 3, then latching lugs that are here referred to as A and B can engage either into the latching recesses 1, 2 or 2, 3, i.e. take up two positions. Thus, the attaching bead receiving portion receives therein the first cranked attaching bead; the latching lugs reach into the latching recesses. The first cranked attaching bead can be disposed, preferably with an interference fit, in the attaching bead receiving portion.

According to another embodiment of an assembly according to the disclosure, it may be provided that, spaced apart from the first attaching bead receiving portion, particularly in the direction towards the inside of the vehicle, a group of second attaching bead receiving portions, in particular three second attaching bead receiving portions, is formed, which are disposed one behind the other relative to the movement axis. The second attaching bead receiving portions may be disposed at a constant or varying distance from one another.

According to another embodiment of an assembly proposed by the disclosure, it may be provided that the second adjustment member has a bead-like flange at a first end, and a receiving section at a second end opposite the first end. Preferably, the second attaching bead receiving portions are adapted to the shape of the bead-like flange with regard to their geometry or cross section. The latter may also can be disposed in one of the second attaching bead receiving portions—preferably with an interference fit. Depending on which of the three second attaching bead receiving portions the bead-like flange of the second adjustment member is arranged in, the angle of the first adjustment member (and thus, of the sealing strip) relative to the tread surface can be set thereby. 90°, 80°, 70°, 60°, 50° or 40° are to be mentioned as possible, but not exclusive, angles. Angles that lie between these angle values may also be provided between the first adjustment member and the tread surface. Different lengths of the first and second adjustment members can also be used due to the different second attaching bead receiving portions.

As was already mentioned, it may thus be provided, according to another embodiment of an assembly proposed by the disclosure, that the bead-like flange of the second adjustment member can be received with a positive fit in one of the second attaching bead receiving portions, wherein the second cranked attaching bead of the first adjustment member can be received in the receiving section of the second adjustment member with a positive fit. The above-mentioned positive fit may be a positive and non-positive connection (e.g. an interference fit). The connection of the second cranked attaching bead with the second adjustment member via the receiving section may include a movable pivot bearing, i.e. the second adjustment member may be pivotable relative to the first adjustment member (provided that the bead-like flange is not disposed in one of the second attaching bead receiving portions).

According to another embodiment of an assembly according to the disclosure, it may be provided that the receiving pocket formed on the first adjustment member is configured for positively receiving a sealing strip bead formed on the sealing strip. Also in this case, the positive-fit accommodation may be understood to be an accommodation based on a positive and non-positive fit (e.g. an interference fit). The position of the sealing strip—depending on the position of the first adjustment member—can be adjusted by means of such a connection between the sealing strip and the first adjustment member. The sealing strip bead may have a shape corresponding with the shape of the receiving pocket, particularly with regard to the cross section of the receiving pocket.

According to another embodiment of an assembly according to the disclosure, it may be provided that the first and/or second adjustment members are formed like a linkage. This may mean that the first and/or second adjustment members each have a basic body formed like a linkage.

According to another embodiment of an assembly according to the disclosure, it may be provided that the first and/or second adjustment members extend parallel to and along the sealing strip. It may also be provided that the first adjustment member extends parallel to and along the sealing strip, whereas the second adjustment member is configured like a linkage. It may further be provided that the second adjustment member extends parallel to and along the sealing strip, whereas the first adjustment member is configured like a linkage. In order to provide a modular system, the first and second adjustment members may be fabricated in different sizes, stored and used.

According to another embodiment of an assembly according to the disclosure, it may be provided that the first attaching bead receiving portion is configured in the form of a receiving groove, which extends parallel to and in a direction along the tread step module front edge, and that the first cranked attaching bead of the first adjustment member extends parallel to and in a direction along the tread step module front edge. Such a configuration may provide for a particularly mechanically rugged design of the component members involved, which may increase the life of the system.

According to another embodiment of an assembly according to the disclosure, it may be provided that the second attaching bead receiving portions are each configured in the form of receiving grooves, which extend parallel to and in a direction along the tread step module front edge, and that the bead-like flange of the second adjustment member extends parallel to and in a direction along the tread step module front edge. This configuration may also provide a particularly mechanically rugged design of the component members involved, which may increase the life of the system.

According to another embodiment of an assembly according to the disclosure, it may be provided that the receiving pocket of the first adjustment member is configured in the form of a receiving groove, which extends parallel to and in a direction along the tread step module front edge, and that the sealing strip bead extends parallel to and in a direction along the tread step module front edge. This configuration may also provide a particularly mechanically rugged design of the component members involved, which may increase the life of the system.

According to another embodiment of an assembly according to the disclosure, it may be provided that the receiving section of the second adjustment member is configured in the form of a receiving groove, which extends parallel to and in a direction along the tread step module front edge, and that the second cranked attaching bead of the first adjustment member extends parallel to and in a direction along the tread step module front edge. This configuration may also provide a particularly mechanically rugged design of the component members involved, which may increase the life of the system.

According to another embodiment of an assembly according to the disclosure, it may be provided that the first adjustment member forms the sealing strip. In this case, the formation of a receiving pocket at the lower end of the first adjustment member may be dispensed with. In the case of the first adjustment member directly forming the sealing strip, the adjustment member is to be manufactured from a material suitable for sealing (in particular rubber, plastic or metal). A metallic core coated with plastic or rubber may also be provided. In such an embodiment (the first adjustment member forms the sealing strip), the first adjustment member extends parallel to and in a direction along the tread step module front edge. An attaching bead for attachment in a receiving portion on the tread step module may be formed at the upper end of the first adjustment member.

BRIEF DESCRIPTION OF THE DRAWINGS

The disclosure is further explained with reference to the following Figures. They should be understood merely to be an example, and are not supposed to limit the disclosure. In the Figures.

DETAILED DESCRIPTION OF THE DRAWINGS

Figure 2:
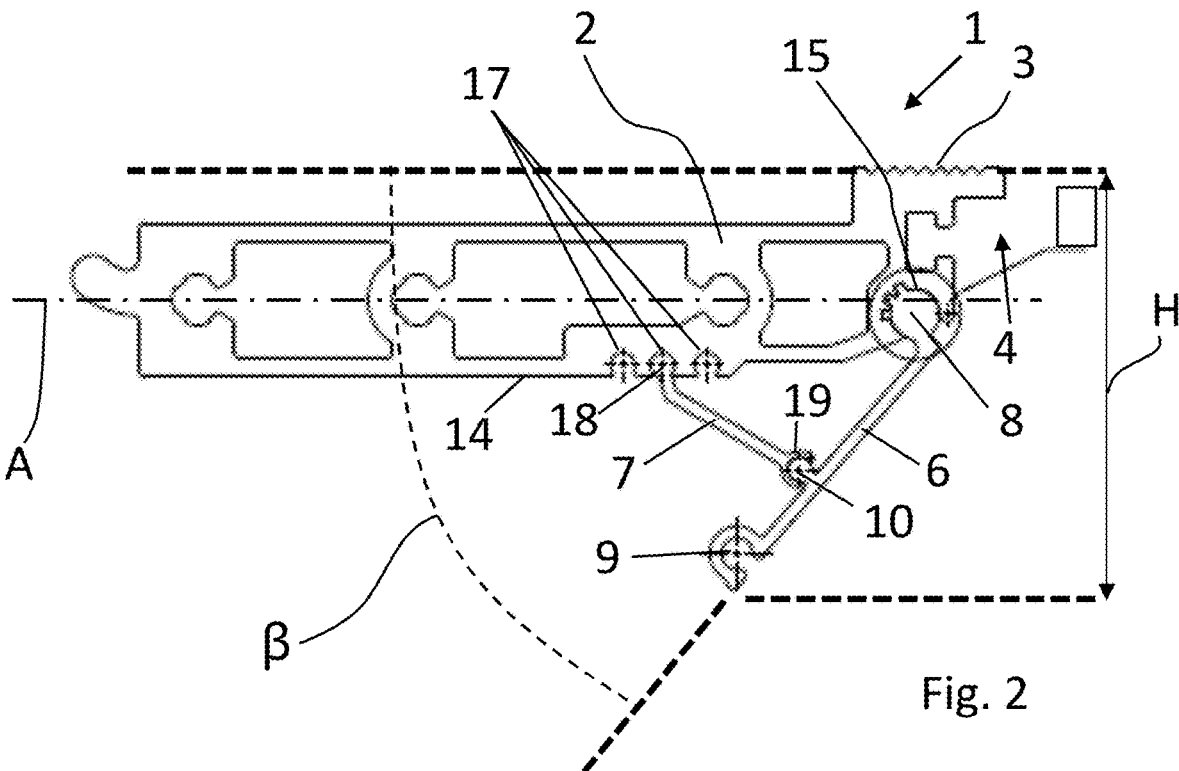
FIG. 2 shows a schematic cross-sectional view of a tread step seal assembly according to the disclosure in the assembled state.

FIG. 2 illustrates the tread step seal assembly 1 on which the disclosure is based in a cross-sectional view in the assembled state. The assembly 1 is used in a vehicle, particularly a rail vehicle, as a so-called boarding aid. As is shown, the assembly 1 comprises a tread step module 2, which, using a drive unit that is not shown, can be moved along a movement axis A from a retracted position in the direction of an extended position and vice versa. The tread step module 2 has a tread surface 3, which is subjected to load by stepping when passengers enter and exit. The tread surface 3 extends in a tread surface plane oriented parallel to the movement axis A. The tread step module 2 has a tread step module front edge 4 at a front end directed towards the outside of the vehicle.

Figure 1:
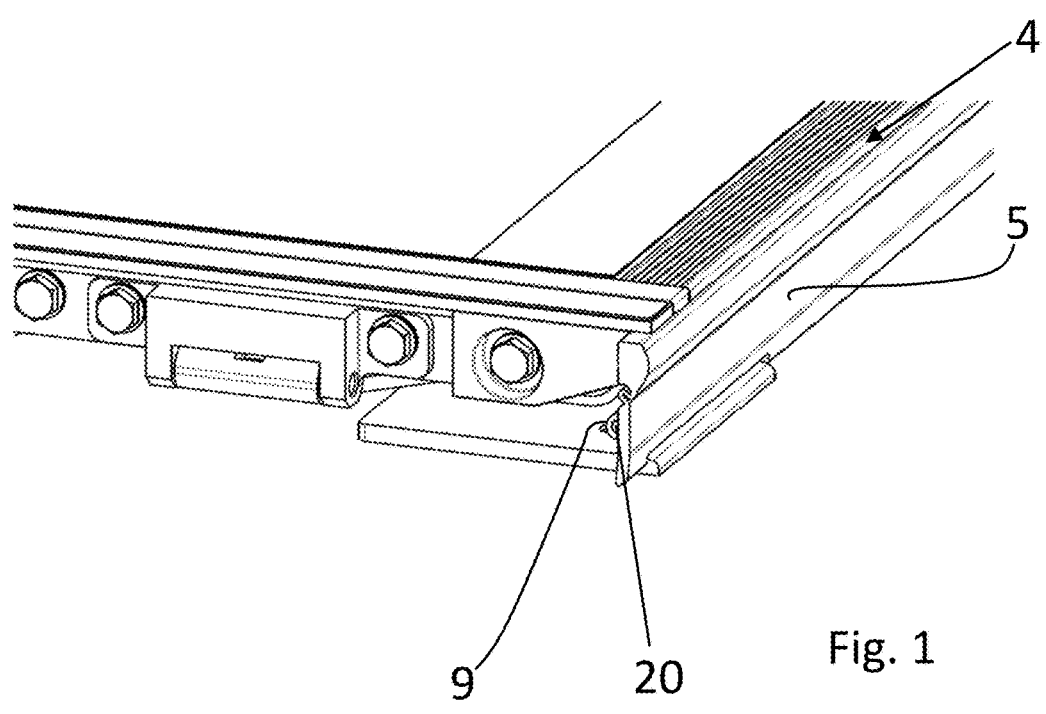
FIG. 1 shows a perspective view of a section of a tread step module front edge of a tread system including a sealing strip.

As is shown in FIG. 1, the assembly also includes a sealing strip 5, which is attached to the tread step module front edge 4 and extends along the tread step module front edge 4 substantially in a sealing strip plane, wherein the sealing strip 5 and the tread step module 2 define, perpendicularly to the movement axis A, a vertical assembly height H (FIG. 2), and wherein the sealing strip 5 and the tread surface 3 are disposed at an angle β to each other.

The assembly height H and the angle β between the sealing strip 5 and the tread surface 3 can be adjusted via a modular mechanism. The above-mentioned modular mechanism includes a first adjustment member 6 and a second adjustment member 7. The first adjustment member 6 has at a first end a first cranked attaching bead 8 and, at a second end opposite the first end, a receiving pocket 9, wherein a second cranked attaching bead 10 is arranged between the first end and the second end. This is again shown in detail in FIG. 4. The first and second cranked attaching beads 8, 10 protrude from a first side 11 of the first adjustment member 6. The receiving pocket 9 also protrudes from the first side 11. Moreover, the receiving pocket 9 is at least partially open in the direction of a second side 12 of the first adjustment member 6 opposite the first side 11.

Figures 3, 4, 5:
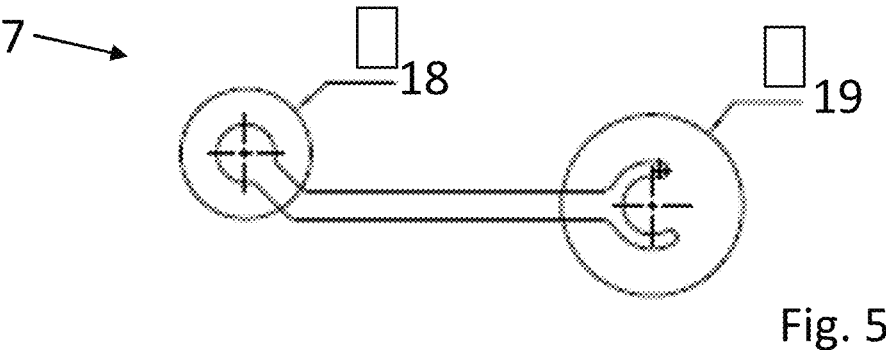
FIG. 3 shows a schematic cross-sectional view of a tread step module as an individual part of an inventive tread step seal assembly according to FIG. 2.
FIG. 4 shows a schematic cross-sectional view of a first adjustment member as an individual part of an inventive tread step seal assembly according to FIG. 2.
FIG. 5 shows a schematic cross-sectional view of a second adjustment member as an individual part of an inventive tread step seal assembly according to FIG. 2.

As can be easily seen particularly in FIG. 4, two latching lugs 13 are formed on the first cranked attaching bead 8. FIG. 3 shows that a first attaching bead receiving portion 15, which is provided for receiving the first cranked attaching bead 8 (FIG. 2), is formed on an underside 14 of the tread step module 2 facing away from the tread surface plane, wherein the receiving portion 15 has three latching recesses 16 for receiving the latching lugs 13, so that the first adjustment member 6 can adopt two angular positions relative to the first attaching bead receiving portion 15.

As is shown in FIG. 3, a group G of three second attaching bead receiving portions 17, which are disposed one behind the other relative to the movement axis A, is formed spaced apart from the first attaching bead receiving portion 15, in the direction towards the inside of the vehicle.

The second adjustment member 7 has a bead-like flange 18 at a first end, and a receiving section 19 at a second end opposite the first end (FIG. 5). The bead-like flange 18 of the second adjustment member 7 can be received with a positive fit in one of the second attaching bead receiving portions 17 (see FIG. 2), wherein the second cranked attaching bead 10 of the first adjustment member 6 can be received in the receiving section 19 of the second adjustment member 7 with a positive fit (also FIG. 2). The receiving pocket 9 formed on the first adjustment member 6 is configured for positively receiving a sealing strip bead 20 formed on the sealing strip 5, which is illustrated by way of example in FIG. 2.

If the second adjustment member 7 is omitted, the first adjustment member 6 may be disposed at an angle of about or exactly 90° relative to the tread surface 3. By providing a second adjustment member 7, an angle β deviating from a perpendicular position of the first adjustment member 6 relative to the tread surface 3 can be set by disposing the bead-like flange 18 in one of the second attaching bead receiving portions 17 and disposing the second cranked attaching bead 10 in the receiving section 19. Depending on which of the second attaching bead receiving portions 17 the bead-like flange 18 is fixed in, different angles R can be set. Moreover, different lengths of the first and/or second adjustment members 6, 7 can be provided due to the plurality of second attaching bead receiving portions 17. Thus, the degrees of freedom for height and angle settings are thus increased.

The invention claimed is:

1. A modular tread step seal assembly for a tread system implemented in a vehicle, the assembly comprising:
    a tread step module, which, using a drive unit, is moved along a movement axis (A) from a retracted position in the direction of an extended position and vice versa, wherein the tread step module has a tread surface extending in a tread surface plane oriented parallel to the movement axis (A), and wherein the tread step module has a tread step module front edge at a front end directed towards the outside of the vehicle, a sealing strip, which is attached to the tread step module front edge and extends along the tread step module front edge substantially in a sealing strip plane, wherein the sealing strip and the tread step module define, perpendicularly to the movement axis (A), a vertical assembly height (H), and wherein the sealing strip and the tread surface are disposed at an angle (B) to each other, wherein the assembly height (H) and the angle (B) between the sealing strip and the tread surface are adjusted using a modular mechanism.

2. The assembly according to claim 1, wherein the modular mechanism comprises a first adjustment member and a second adjustment member.

3. The assembly according to claim 2, wherein the first adjustment member has at a first end a first cranked attaching bead and, at a second end opposite the first end, a receiving pocket, wherein a second cranked attaching bead is arranged between the first end and the second end.

4. The assembly according to claim 3, wherein the first and second cranked attaching beads protrude from a first side of the first adjustment member, that the receiving pocket also protrudes from the first side, and that the receiving pocket is at least partially open in the direction of a second side of the first adjustment member opposite the first side.

5. The assembly according to claim 4, wherein a plurality of latching lugs are formed on the first cranked attaching bead.

6. The assembly according to claim 5, wherein a first attaching bead receiving portion for receiving a first cranked attaching bead is formed on an underside of the tread step module facing away from the tread surface plane, wherein the receiving portion has a plurality of latching recesses for receiving the plurality of latching lugs so that the first adjustment member adopts a plurality of angular positions relative to the first attaching bead receiving portion.

7. The assembly according to claim 6, wherein, spaced apart from the first attaching bead receiving portion, in the direction towards the inside of the vehicle, a group (G) of second attaching bead receiving portions is formed, which are disposed one behind the other relative to the movement axis (A).

8. The assembly according to claim 6, wherein the first and/or second adjustment members extend parallel to and along the sealing strip.

9. The assembly according to claim 8, wherein the first attaching bead receiving portion is configured in the form of a receiving groove, which extends parallel to and in a direction along the tread step module front edge, and that the first cranked attaching bead of the first adjustment member extends parallel to and in a direction along the tread step module front edge.

10. The assembly according to claim 8, wherein the second attaching bead receiving portions are each configured in the form of receiving grooves, which extend parallel to and in a direction along the tread step module front edge, and that the bead-like flange of the second adjustment member extends parallel to and in a direction along the tread step module front edge.

11. The assembly according to claim 8, wherein the receiving pocket of the first adjustment member is configured in the form of a receiving groove, which extends parallel to and in a direction along the tread step module front edge, and that the sealing strip bead extends parallel to and in a direction along the tread step module front edge.

12. The assembly according to claim 8, wherein a receiving section of the second adjustment member is configured in the form of a receiving groove, which extends parallel to and in a direction along the tread step module front edge, and that the second cranked attaching bead of the first adjustment member extends parallel to and in a direction along the tread step module front edge.

13. The assembly according to claim 2, wherein the second adjustment member has a bead-like flange at a first end, and a receiving section at a second end opposite the first end.

14. The assembly according to claim 13, wherein the bead-like flange of the second adjustment member is received with a positive fit in one of the second attaching bead receiving portions, wherein the second cranked attaching bead of the first adjustment member is received in the receiving section of the second adjustment member with a positive fit.

15. The assembly according to claim 2, wherein the first and/or second adjustment members are formed like a linkage.

16. The assembly according to claim 2, wherein the first adjustment member forms the sealing strip.

17. The assembly according to claim 3, wherein the receiving pocket formed on the first adjustment member is configured for positively receiving a sealing strip bead formed on the sealing strip.

* * * * *